| United States Patent [19] | [11] 3,990,358 |
|---|---|
| Cade | [45] Nov. 9, 1976 |

[54] FRUIT PROCESSING APPARATUS

[76] Inventor: Alfred F. Cade, 3 Elizabeth Heights, Elizabeth St., Tauranga, New Zealand

[22] Filed: Dec. 5, 1974

[21] Appl. No.: 529,939

[30] Foreign Application Priority Data

Dec. 10, 1973 New Zealand.......................... 172833

[52] U.S. Cl. .................................. 99/534; 99/545; 99/628; 99/629
[51] Int. Cl.² ...................... A23N 7/01; A23N 4/12
[58] Field of Search ............ 99/516, 534, 540, 542, 99/543, 544, 545, 628, 623, 629

[56] References Cited
UNITED STATES PATENTS 3,351,112  11/1967  Creed ............................... 99/536 X
3,602,282  8/1971  Hirahara ........................... 99/516 X Primary Examiner—Leonard D. Christian
Assistant Examiner—Alan Cantor
Attorney, Agent, or Firm—Stevens, Davis, Miller & Mosher

[57] ABSTRACT

An apparatus for removing the skins from fruit (including vegetables) where the fruit has an elongated shape being substantially cylindrical or egg shaped, and which are particularly suitable for removing the skins from Chinese gooseberries (*Actinidia Chinensis*). The apparatus comprises a heated lye bath for loosening the fruit skin, washing means for removing the loosened skin and conveying means for separately conveying each fruit through the lye bath and the washing means. The conveying means comprises an endless drive loop having projecting dividers adapted to separate and propel each fruit in use. The apparatus includes guide means in the lye bath and through the the washing means defining a path followed by the fruit. The dividers tend to roll the fruit along said path when the fruits contact the guide means.

20 Claims, 6 Drawing Figures

FRUIT PROCESSING APPARATUS

BACKGROUND OF THE INVENTION

This invention relates to an apparatus for automatically removing the skins from fruit. The invention has been devised particularly for processing Chinese gooseberries (*Actinidia Chinensis*).

A Chinese gooseberry is a fruit having a slightly elongated shape and is symmetrical about its longitudinal axis or core. The fruit tends to be almost cylindrical in shape, though the ends are somewhat rounded. The size of the fruit varies, depending to some extent upon its quality, but a typical Chinese gooseberry might have a length of approximately 4 – 5 cm and a diameter mid-way along its length of approximately 3 – 4 cm. The flesh of the fruit is delicate and tends to bruise easily and is covered with a delicate and thin skin from which projects a fibrous mat of fine bristles or hairs, which are about 1 – 2 mm in length. Usually the high quality fruit is sold in the as picked state to the public, this following a grading operation and perhaps an operation in which the fibrous hairs are removed. The lower quality or second grade fruit is processed for canning, though at present much is wasted because of the inefficiency of present hand processing methods whereby large quantities of fruit cannot be handled economically. In the past, because of the delicate nature of both the fruit itself, which makes it susceptible to bruising, and its thin skin, it has not been possible to machine process Chinese gooseberries and obtain a satisfactory product suitable for canning. For example, the present method of processing Chinese gooseberries involves mainly manual operations. The graded fruit usually has the fibrous hairs removed by friction, which may be achieved by passing the fruit through a system of roller brushes for example. With the fibrous hairs largely removed, the fruit then has its skin removed, perhaps after lye softening, by operators using hand held tools. This operation tends to be very time consuming as the fruit must be handled carefully and to achieve a reasonable rate of production, a large number of operators must be employed, this giving rise to high production costs and hence an expensive end product.

Often in preparing the fruit for canning, the fruit is sliced (usually transverse to its length). As the fruit which is being processed is usually still in its green stage, the core may tend to be rather hard which detracts from the quality of the end product. Where this is the case, the core of the Chinese gooseberry is removed before the slicing operation. In riper Chinese gooseberries the core is softer and this is not a problem.

In the past, numerous machines have been developed for the purpose of processing various fruits, this term including vegetables. However, these machines are not satisfactory for processing Chinese gooseberries. In some machines which use a lye bath and a washing operation to remove the skins from fruit, the fruit is handled in bulk at some stage in the operation, or several fruits are handled together which in the case of Chinese gooseberries would lead to bruising of the fruit. Other machines which have been devised to handle fruits separately throughout the skin removal operation, use spikes or similar projections to retain the fruit in a desired position, this commonly being used to ensure that the fruit is correctly aligned for a de-coring operation. Such spikes, if used with Chinese gooseberries, would also tend to bruise the fruit. Furthermore, a manual operation is usually required to place the fruit on the spikes.

Other machines have cups or similar receptacles in which individual fruits are located and conveyed through the processing apparatus. Individual fruits held in such receptacles tend to be retained in a substantially fixed position relative to the receptacle and there tends to be a large contact area between the fruit and the receptacle. This is a disadvantage where Chinese gooseberries are concerned because in spite of the usual operation to remove the fibrous hairs from the skin, a number of the hairs may still cling to the skin and act to retain bubbles of air in contact with the skin of the fruit when this is passing through the lye bath. When air remains in contact with the skin during this stage, the skin is not softened and loosened by the lye solution and later on in the process during the washing stage, the skin cannot be easily removed from the fruit. Such receptacles are not always entirely satisfactory for use even with fruits other than Chinese gooseberries where there is a large contact area between the fruit and the receptacle as this tends to reduce the effectiveness of the lye solution in loosening or softening the skin of the fruit where it is in contact with the receptacle.

Reference may be made to U.S. Pat. Nos. 3024822, 3096800, 3351112, 3352338 which illustrate the above comments and display the above mentioned disadvantages.

SUMMARY OF THE INVENTION

The general purpose of this invention is to provide an apparatus for removing skins from fruit having an enlongated shape being substantially symmetrical about the longitudinal axis and being substantially cylindrical and egg shaped. The apparatus has been devised particularly for removing the skin from Chinese gooseberries (*Actinidia Chinensis*), this fruit having a delicate fresh and a thin and delicate skin.

In one aspect, the present invention consists in an apparatus for removing the skins from fruit having an enlongated shape being substantially symmetrical about the longitudinal axis and being substantially cylindrical or egg shaped the apparatus comprising a heated lye bath, washing means, and conveying means for separately conveying each fruit through the lye bath and past or through the washing means; the conveying means comprising an endless drive loop, constraining means to constrain movement of the drive loop in a chosen path and dividers projecting from the drive loop to define between adjacent pairs of dividers an individual pocket or space which is adapted to take a fruit in use, lye bath guide means defining a path parallel to that taken by at least a portion of the loop which travels in the lye bath in use and substantially enclosing each pocket so that the fruits cannot float away from said path in use, and washer guide means defining a path parallel to that taken by at least a portion of the loop which passes through or by the washing means in use providing upwards support for the fruit while yet allowing access to the fruit skins for the washing process, the dividers tending to roll the fruit which are not self moving under the influence of gravity along said paths when the fruits are in contact with a surface of the lye bath guide means or the washer guide means.

In a second aspect, the present invention consists in an apparatus for removing the skins from Chinese gooseberries (*Actinidia Chinensis*) comprising means for the removal of the fibrous hairs which cover the skin of the Chinese gooseberry, means for removing the ends of each Chinese gooseberry, a heated lye bath, washing means, and conveying means for separately conveying each Chinese gooseberry through the lye bath, and past or through the washing means; the conveying means comprising an endless drive loop, constraining means to constrain movement of the drive loop in a chosen path and dividers projecting from the drive loop to define between adjacent pairs of dividers an individual pocket or space which is adapted to take a chinese gooseberry in use, lye bath guide means defining a path parallel to that taken by at least a portion of the loop which travels in the lye bath in use and substantially enclosing each pocket so that the Chinese gooseberries cannot float away from said path in use, and washer guide means defining a path parallel to that taken by at least a portion of the loop which passes through or by the washing means in use providing upwards support for the Chinese gooseberries while yet allowing access to the Chinese gooseberry skins for the washing process, the dividers tending to roll the Chinese gooseberries which are not self moving under the influence of gravity along said paths when the Chinese gooseberries are in contact with a surface of the lye bath guide means or the washer guide means.

In a third aspect, the present invention consists in a method of removing the skins from Chinese gooseberries (*Actinidia Chinensis*) comprising the steps of removing the ends of each fruit, passing the fruit separately on conveying means through a heated lye bath, the time spent by each fruit in the lye bath being sufficient to cause the skin of the fruit to substantially loosen from the flesh of the fruit, and separately conveying each fruit through washing means where the fruit is subjected to water sprays and brushings to remove the skin from the fruit.

In a fourth aspect, the present invention consists in a method of processing Chinese gooseberries comprising the steps of feeding graded fruit on to conveying means with the length of each fruit lying transversely across the conveying means, conveying the fruit pass cutting means adapted to remove both ends, conveying the fruit through a lye bath for an appropriate period of time, the lye bath being held at an appropriate temperature to soften the skins, treating each fruit separately by means of water sprays and brushing to remove the softened skin and de-coring each fruit as it passes a reciprocable hollow punch.

The preferred form of the present invention will be described with reference to the accompanying drawings in which:

FIG. 3 is a schematic view from the side showing the washing means and the conveying means for carrying the fruit through the washing means.

Figure 4:
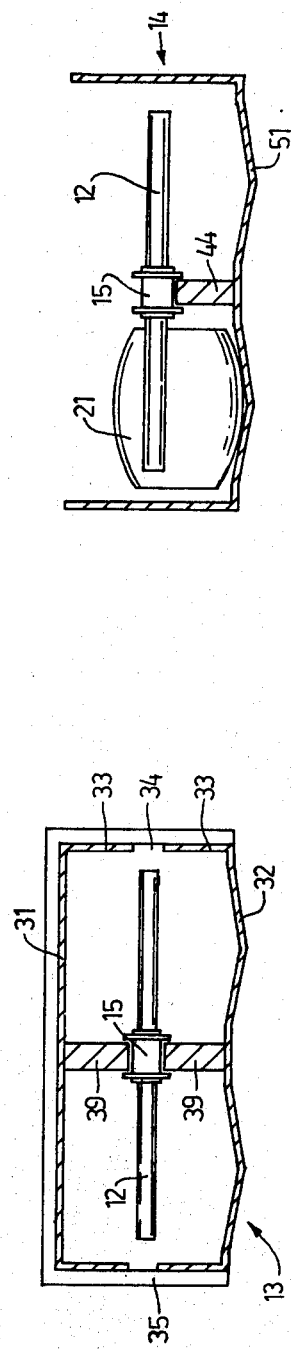

FIG. 4. is a cross-sectional view through the conveying means for conveying the fruit through the lye bath.

Figure 5:
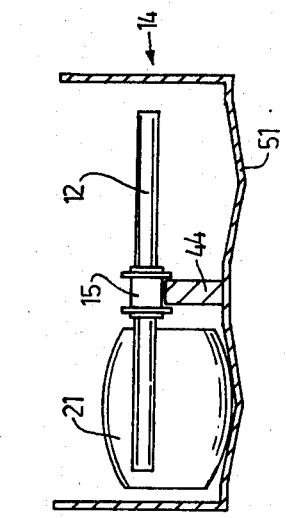
Figure 6:
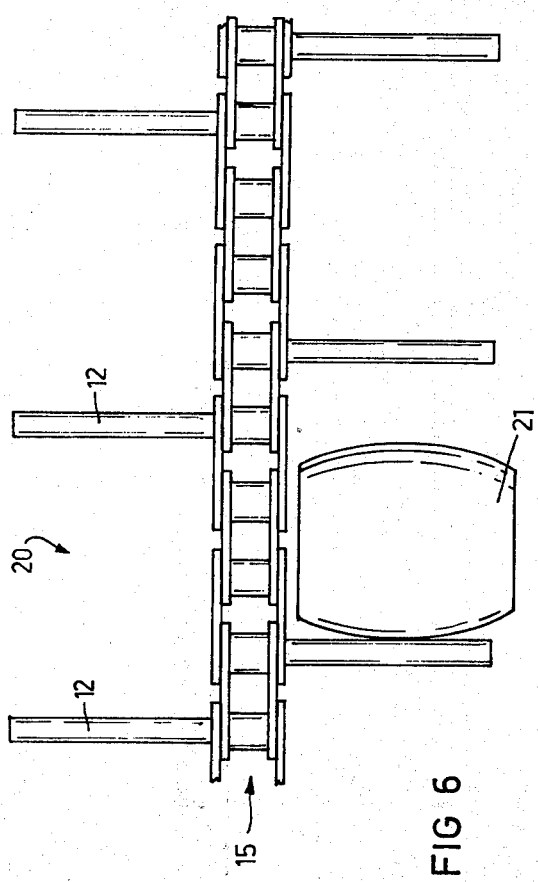

FIG. 5 is a cross-sectional view through the conveying means for conveying the fruit through the washing means, and FIG. 6 is a plan view of a portion of the drive loop chain showing the dividers projecting from each side.

DETAILED DESCRIPTION OF THE INVENTION

Figure 1:
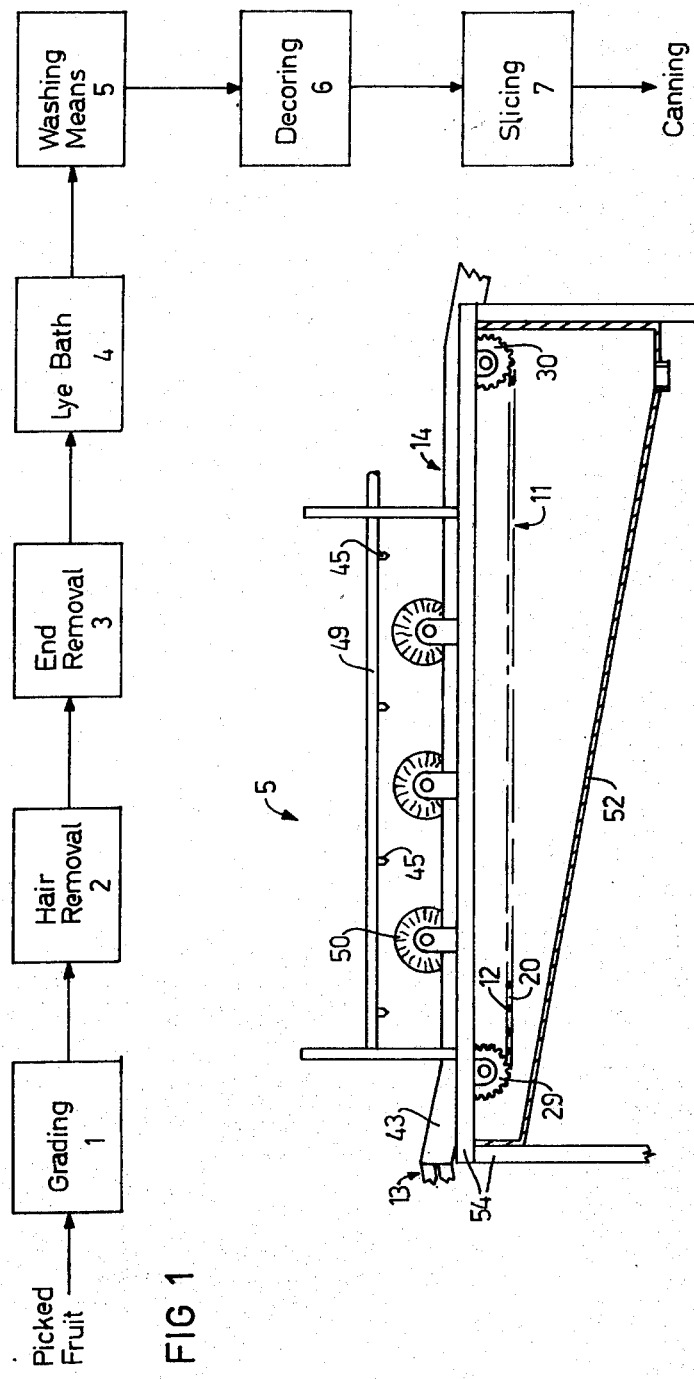
FIG. 1 is a block diagram showing the various stages involved in processing 'as picked' Chinese gooseberries through to a stage where they are suitable for canning.
Figure 2:
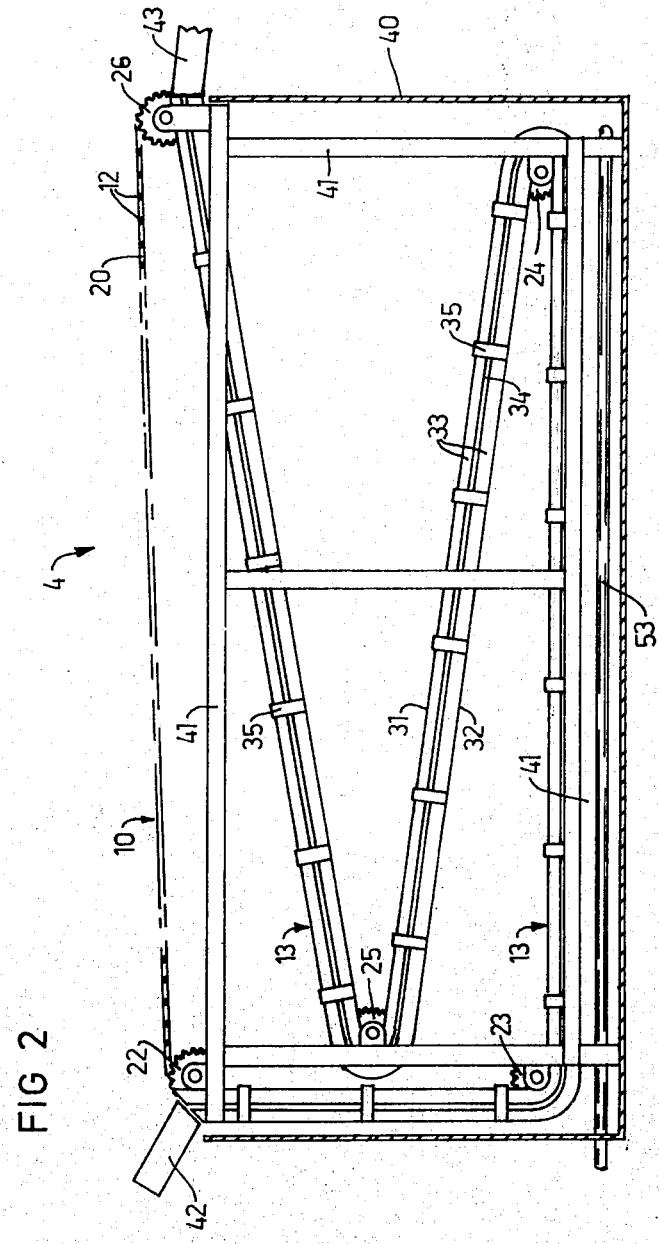
FIG. 2 is a schematic view from the side showing the lye bath and the conveying means for conveying the fruit through the lye bath.

Referring to the drawings, FIG. 1 shows the sequence of operations in fully processing Chinese gooseberries from the 'as picked' state through to a state where they are suitable for canning or some equivalent operation. Conveying means, including conveyor belts are used to convey the fruit from the beginning to the end of this sequence of operations so that the process is fully automated. The 'as picked' fruit is first graded at 1 and the graded fruit which is to be processed passes to a hair removal stage 2 where the mat of fibrous hair covering Chinese gooseberries is largely removed. A common method of removing the fibrous hair involves passing the fruit through a system of roller brushes or through an abrasive cylinder through which the fruit is rotated on an inclined plane. From this stage the fruit is taken by a conveyor to means 3 for removing the ends of the fruit. Conventional apparatus may be used for this purpose, for example the fruit may be carried on a segmented conveyor belt where each segment serves as a receptacle holding one Chinese gooseberry with its length lying transversely across the width of the conveyor. The conveyor is narrower than, and passes between two rotating cutting discs which are adapted to remove the ends of the fruit, the fruit being longer than the width of the conveyor belt.

The fruit then passes through two operations where the skin is removed. Firstly, the fruit passes through a lye bath 4 where, under the action of the lye solution, the skin is softened and loosened from the flesh of the fruit, then through washing means 5 where the skin of the fruit is actually removed.

From the washing means 5 the fruit may be carried on a second segmented conveyor belt where the segments are adapted to provide receptacles for holding each fruit in place and separate from other fruits.

Once the skin of a Chinese gooseberry has been removed, the fruit may be canned as is. However, if the chinese gooseberry is being processed in a relatively green state, the core tends to be hard and tasteless and in this case it is desirable that the core be removed by de-coring stage 6, where a conventional type of de-coring punch may be used.

The de-coring punch used has a hollow tube which reciprocates transversely with respect to the conveyor and is adapted to impale and remove the core from each skinned fruit as it passes the punch. The timing of the punch is controlled from the conveyor by known techniques. The de-cored fruit may be canned, or prior to canning may pass through a further stage 7 where the fruit is sliced transverse to its axis. Commonly used fruit slicing apparatus is used for this operation. Such apparatus includes a plurality of rotating cutting discs through which the fruit is passed.

In an alternative sequence of operations, the means 3 for removing the ends of the fruit may be left out as the ends of the fruit may be removed during either the de-coring operation or the slicing operation. Obviously the hair removal stage 2 may be left out when processing the fruit which does not have its skin covered with fibrous hair.

In the preferred form of the invention, apparatus is provided for removing the skins from fruit having an elongated shape being substantially symmetrical about the longitudinal axis and being substantially cylindrical or egg shaped. The apparatus comprises a heated lye bath 4, washing means 5 and conveying means for separately conveying each fruit through the lye bath 4 and past or through the washing means 5, the conveying means having an endless drive loop which provides the drive for moving the fruit through the lye bath 4 and the washing means 5. While a single loop can be used to achieve this purpose, the apparatus as shown in drawings uses a separate endless drive loop for each of the lye bath 4 and the washing means 5, these being drive loops 10 and 11 respectively. For each drive loop there are constraining means to constrain movement of the drive loop in a chosen path. Dividers 12 project from the drive loops 10 and 11 to define between adjacent pairs of dividers an individual pocket or space 20 adapted to take a fruit in use.

In the lye bath 4, bye bath guide means 13 define a path parallel to that taken by at least a portion of the drive loop 10 which travels in the lye bath in use and the lye bath guide means 13 substantially encloses each pocket or space between the dividers so that the fruit cannot float away from the path in use. Washer guide means 14 pass through the washing means 5 and define a path parallel to that taken by at least a portion of the drive loop 11, which passes through or by the washing means. The washer guide means 14 provides upward support for the fruit while yet allowing access to the fruit skins for the washing process. Fruits which are not self moving under the influence of gravity are pushed along the guide means 13 and 14 by the dividers 12, which tend to roll the fruits when these are in contact with a surface of the guide means 13 or 14.

Each of the drive loops 10 and 11 comprises a chain 15 and the dividers 12 project horizontally in use from opposite sides of the chain 15 so that two lines of fruit may be processed simultaneously. With the dividers 12 projecting horizontally, the drive loops 10 and 11 lie in a substantially vertical plane.

It is desirable that the area of contact between the dividers 12 and the fruit, when being pushed along by the dividers, be as small as possible, so that most of the skin of the fruit is exposed either to the lye solution or to the washing process. This is achieved by dividers 12 which are cylindrical projections from the drive loop and which are adapted to contact the fruit in use along a strip parallel to the axis of the fruit. Where each drive loop comprises a chain 15, the dividers 12 are conveniently provided by extensions of some of the link pins of the chain as shown in FIG. 6. The spaces or pockets 20 between adjacent pairs of dividers 12 are of such size that only one fruit may be accommodated in each space 20. The fruit 21 shown in FIGS. 5 and 6 has had its ends removed.

The constraining means used to constrain movement of the drive loops 10 and 11 in a chosen path include pulleys or sprockets about which the drive loops pass. In the lye bath 4 the chain 15 of drive loop 10 passes about the sprockets 22, 23, 24, 25 and 26, whereas in the washing means 5, the chain 15 of the drive loop 11 passes about the sprockets 29 and 30. One of the sprockets associated with the drive loop 10 and one of the sprockets associated wiyh the drive loop 11 are driven; a single motor may be used, for example, to drive sprockets 26 and 29. The constraining means also includes slides or rails which support and locate the drive loops 10 and 11.

The lye bath guide means 13 substantially encloses a portion of the drive loop 10 along the path to be followed by the fruit; the return portion of the drive loop 10 between sprockets 22 and 26 not being enclosed by lye bath guide means 13. Referring to FIG. 4, the lye bath guide means 13 has an upper and a lower surface 31 and 32 respectively, the edges of which are folded to form sides 33, along each of which a gap 34 is left to permit circulation of lye solution through the lye bath guide means 13. The upper and lower surfaces 31 and 32 are joined together at intervals along the length of the lye bath guide means 13 by U-shaped brackets 35. From each of the upper and lower surfaces 31 and 32 projects a rail or slide 39. These slides 39 provide further constraining means which support and locate the drive loop chain 15. One of the surfaces 31 or 32 of the lye bath guide means 13, this being the surface along which the fruit rolls in use, has a shape adapted to cradle each fruit so that it rolls easily. In FIG. 4 the lower surface 32 of the lye bath guide means 13 is shown having a shallow V-shaped on each side of the slide 39 for this purpose.

The path through the lye bath is preferably circuitous and substantially in one plane, this being the vertical plane as the projections 12 from the drive loops 10 and 11 extend horizontally. This circuitous path is not essential but is desirable from the point of view of reducing the space occupied by the lye bath 4 as it enables a longer path length to be obtained for a given size of the lye bath. The lye bath 4 comprises an outer tank 40 which contains the lye solution and in which the lye bath guide means 13 and the drive loop 10 are located. A frame 41 provides support for the lye bath guide means 13. Fruit enters the lye bath 4 via downwardly inclined chute 42 and follows the path through the lye bath 4 defined by the lye bath guide means 13.

The lye solution is heated to a temperature of about 100° C, this high temperature increasing the activity of the lye solution on the skins of the fruit and reducing the time that the fruit must spend in the lye bath before the skins are loosened. A steam pipe 53 in the lye bath 4 is used to heat the bath. Different fruits will require different times in the lye bath and fruit of the one kind, but ripened to differing extents, will also usually require different times in the lye bath. For this reason, it is desirable that a variable speed motor be used to drive the drive loop 10 so that there is control over the time spent by each fruit in the lye bath. The time for which the fruit is held in the lye bath 4 is fairly critical and the time is chosen so that the skin is ready to lift from the fruit when it leaves the lye bath but burning of the flesh of the fruit by the lye solution is minimal. For Chinese gooseberries a time of about 1½ minutes in the lye solution is suitable, when the concentration of the solution is about 10% by weight.

From the lye bath 4 the fruit is transferred to the washing means 5 by rolling down an inclined chute 43 which carries the fruit on to the drive loop 11 of the washing means 5. As an alternative to a chute, an intermediate conveyor belt could be used for this purpose. The washer guide means 14 defines a path parallel to that taken by at least a portion of the drive loop 11, this following substantially horizontal path through the washing means 5, and provides washing access from above to the fruit passing along this path.

FIG. 5 shows a cross section through the washer guide means 14 with the chain 15 of the drive loop 11 in position. The basic shape of the washer guide means 14 is similar to that of the lye bath guide means 13, but is open at the top. The chain 15 is supported by a single slide 44.

The washing means 5 comprises jets or sprays of water directed at the fruit from nozzles 45 which are connected to an overhead pipe 49. While the jets or sprays of water will usually remove the loosened skins from the fruit, tougher patches of skin may adhere to the flesh of the fruit and to remove these the washing means 5 also includes means for brushing the surfaces of the fruit. Soft haired brushes 50, rotatable about a horizontal axis transverse to the washer guide means path, are used and badger hair brushes are preferred. The brushes 50 rotate against the motion of the fruit as this rolls along the washer guide means 14. The lower surface 51 of the washer guide means 14 is perforated where the guide means passes under the sprays of jets of water. These perforations enable the skin removed from the fruit to be washed through into a trough 52 located beneath the washer guide means 14. A frame 54 supports the apparatus of the washing means 5.

Each divider 12 when pushing a fruit 21 through the lye bath 4 or through the washing means 5 makes contact with the fruit on the side of its longitudinal axis farthest away from the surface of the lye bath guide means 13 or washer guide means 14 contacting the fruit and this assists in rolling the fruit along the paths defined by the guide means. If the pushing action of the divider was applied too close to the point of contact of the fruit with the guide means, then rolling of the fruit would be inhibited and the fruit may instead slide along the guide means, this causing removal of the skin of the fruit in the lye bath and possible damage to the flesh of the fruit. The rolling of the fruit ensures that the surface of each fruit is fully exposed to the lye solution and to the sprays and brushes of the washing means.

What I claim is:

1. An apparatus for removing the skins from fruit having an elongated shape being substantially symmetrical about the longitudinal axis and being substantially cylindrical or egg shaped, the apparatus comprising a heated lye bath, washing means, and conveying means for separately conveying each fruit through the lye bath and past the washing means; the conveying means comprising an endless drive loop, constraining means to constrain movement of the drive loop in a chosen path and dividers projecting from the drive loop to define between adjacent pairs of dividers an individual pocket which is adapted to accommodate a fruit in use, lye bath guide means defining a path parallel to that taken by at least a portion of the loop which travels in the lye bath in use and substantially enclosing each pocket so that the fruit cannot float away from said path in use, and washer guide means defining a path parallel to that taken by at least a portion of the loop which passes by the washing means in use providing upwards support for the fruit while yet allowing access to the fruit skins for the washing process, the dividers tending to roll the fruit which is not self moving under the influence of gravity along said paths when the fruit is in contact with a surface of at least one of the lye bath guide means and the washer guide means.

2. An apparatus as claimed in claim 1 wherein the dividers are cylindrical projections projecting from the drive loop, the drive loop is a chain comprising links and link pins and the dividers are extensions of some of the link pins of the chain.

3. An apparatus as claimed in claim 2 wherein the dividers project horizontally from opposite sides of the drive loop chain and drive loop moves in a substantially vertical plane.

4. An apparatus as claimed in claim 3 wherein the constraining means includes sprockets about which the drive loop chain passes.

5. An apparatus as claimed in claim 4 wherein the constraining means also includes slides which support and locate the drive loop.

6. An apparatus as claimed in claim 1 wherein the lye bath guide means substantially encloses a portion of the drive loop and wherein the washer guide means defines a substantially horizontal path and provides washing access from above to the fruit passing along said path.

7. An apparatus as claimed in claim 6 wherein the lye bath guide means and the washer guide means have surfaces along which the fruit rolls in use, said surfaces having a dished shape adapted to cradle each fruit so that it rolls easily.

8. An apparatus as claimed in claim 7 wherein the path through the lye bath is circuitous in substantially one plane.

9. An apparatus as claimed in claim 7 wherein each divider, when pushing a fruit, makes contact with said fruit on the side of its longitudinal axis furthest away from the surface of the lye bath guide means or washer guide means contacting the fruit.

10. An apparatus as claimed in claim 1 wherein the washing means comprise sprays of water directed at the fruit.

11. An apparatus as claimed in claim 10 wherein the washing means also include means for brushing the surfaces of the fruit.

12. An apparatus as claimed in claim 11 wherein the brushing means includes a soft haired brush rotatable about a horizontal axis transverse to the washer guide means path.

13. An apparatus as claimed in claim 1 which includes means for removing the ends from the fruit.

14. An apparatus as claimed in claim 1 which includes means for de-coding the fruit.

15. An apparatus as claimed in claim 1 which includes means for slicing the skinned fruit.

16. An apparatus for removing the skins from Chinese gooseberries (*Actinidia Chinesis*) comprising means for the removal of the fibrous hairs which cover the skin of the Chinese gooseberry, means for removing the ends of each Chinese gooseberry, a heated lye bath, washing means, and conveying means for separately conveying each Chinese gooseberry through the lye bath and past the washing means; the conveying means comprising an endless drive loop, constraining means to constrain movement of the drive loop in a chosen path and dividers projecting from the drive loop to define between adjacent pairs of dividers an individual pocket which is adapted to accommodate a Chinese gooseberry in use, lye bath guide means defining a path parallel to that taken by at least a portion of the loop which travels in the lye bath in use and substantially enclosing each pocket so that the Chinese gooseberries cannot float away from said path in use, and washer guide means defining a path parallel to that taken by at least a portion of the loop which passes by the washing means in use providing upwards support for the Chinese gooseberries while yet allowing access to the Chinese gooseberry skins for the washing process, the dividers tending to roll the Chinese gooseberries which are not self moving under the influence of gravity along said paths when the Chinese gooseberries are in contact with a surface of at least one of the lye bath guide means and the washer guide means.

17. An apparatus as claimed in claim 16 wherein the apparatus also comprises means for slicing the Chinese gooseberry once the skin has been removed.

18. An apparatus as claimed in claim 17 wherein the apparatus also includes means for de-coding the Chinese gooseberry prior to its being sliced.

19. An apparatus for removing the skins from fruit having an elongated shape being substantially symmetrical about the longitudinal axis and being substantially cylindrical or egg shaped, the apparatus comprising a heated lye bath, washing means, and conveying means for separately conveying each fruit through the lye bath and past the washing means; the conveying means comprising an endless drive loop, constraining means to constrain movement of the drive loop in a chosen path which lies in a substantially vertical plane and dividers projecting substantially horizontally from the drive loop to define spaces between adjacent pairs of dividers, the distance between adjacent dividers being sufficient to enable such space to accomodate only a single fruit in use, the dividers and the endless drive loop providing no support for the fruit when the fruit is being conveyed substantially horizontally and only serving to propel the fruit along said path, stationary lye bath guide means defining a duct parallel to the path taken by at least a portion of the loop which travels in the lye bath in use and adapted to substantially enclose each fruit as it passes through the lye bath so that the fruit cannot float away from said path in use, and stationary washer guide means defining a duct parallel to the path taken by at least a portion of the loop which passes by the washing means in use providing upwards support for the first while yet allowing access to the fruit skins for the washing process, at least part of said endless drive loop lying within said ducts, the dividers tending to roll the fruit which are not self moving under the influence of gravity along said ducts when the fruit is in contact with a surface of said ducts.

20. An apparatus for removing the skins from fruit having an elongated shape being substantially symmetrical about its longitudinal axis and being substantially cylindrical or egg shaped, said apparatus comprising:

a heated lye bath;

washing means;

conveying means for conveying the fruit individually through the lye bath and past the washing means, said conveying means comprising an endless drive loop;

constraining means to constrain movement of the drive loop in a predetermined path;

lye bath guide means defining a duct parallel to the path taken by at least a portion of the loop which travels in the lye bath for substantially enclosing each fruit as it passes through the lye bath so that the fruit cannot float away from the path;

washer guide means defining a duct, having a stationary bottom surface over which the fruit are conveyed for supporting the fruit, parallel to the path taken by at least a portion of the loop which passes by the washing means; and cylindrical projections, projecting from and movable with the drive loop, for rolling the fruit along the path taken by at least a portion of the loop which travels in the lye bath when the fruit is in contact with a surface of the duct of the lye bath guide means and for rolling the fruit along the path taken by at least a portion of the loop which passes by the washing means when the fruit is supported by the bottom surface of the duct of the washer guide means, each set of next adjacent pairs of projections defining therebetween an individual pocket of a size to accommodate only a single fruit.

* * * * *